(12) United States Patent
Fogg

(10) Patent No.: US 6,455,603 B1
(45) Date of Patent: Sep. 24, 2002

(54) POLYMER POLYOLS AND A PROCESS FOR THE PRODUCTION THEREOF

(75) Inventor: Graeme D. Fogg, Vogelwaarde (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/701,976

(22) PCT Filed: Jun. 30, 1998

(86) PCT No.: PCT/US98/13771

§ 371 (c)(1),
(2), (4) Date: Dec. 1, 2000

(87) PCT Pub. No.: WO00/00531

PCT Pub. Date: Jun. 6, 2000

(51) Int. Cl.⁷ .................................................. C08J 9/00
(52) U.S. Cl. ........................ 521/137; 521/155; 521/170; 521/174; 524/762; 524/765; 524/773
(58) Field of Search ................................. 524/762, 765, 524/773; 521/137, 155, 170, 174

(56) References Cited

U.S. PATENT DOCUMENTS

| | | |
|---|---|---|
| 3,629,308 A | 12/1971 | Bailey et al. |
| 3,913,092 A | 10/1975 | Klingenberg et al. |
| 4,014,846 A | 3/1977 | Ramlow et al. |
| 4,093,573 A | 6/1978 | Ramlow et al. |
| 4,148,840 A | 4/1979 | Shah |
| 4,172,825 A | 10/1979 | Shook et al. |
| 4,342,840 A | 8/1982 | Kozawa et al. ............. 521/137 |
| 4,390,645 A | 6/1983 | Hoffman et al. ............ 521/137 |
| 4,454,255 A | 6/1984 | Ramlow et al. ............ 521/137 |
| 4,458,038 A | 7/1984 | Ramlow et al. ............ 521/137 |
| 4,661,531 A | 4/1987 | Davis et al. ................. 521/137 |
| 4,745,153 A | 5/1988 | Hoffman ..................... 524/762 |
| RE32,733 E | 8/1988 | Simroth et al. ............. 521/137 |
| 5,196,476 A | 3/1993 | Simroth ...................... 524/769 |
| 5,364,906 A | 11/1994 | Critchfield et al. .......... 525/53 |
| 5,394,491 A | 2/1995 | Inoue et al. .................. 385/16 |

FOREIGN PATENT DOCUMENTS

| | | |
|---|---|---|
| EP | 0 162 589 B1 | 2/1989 |
| WO | WO 95/04149 | 2/1995 |

*Primary Examiner*—John M. Cooney, Jr.

(57) ABSTRACT

Polymer polyols and process for their production are disclosed. The process requires the selection of specified free radical polymerization initiators and amounts thereof to produce a polymer polyol having desired properties including a Brookfield Viscosity of equal to or less than (a $e^{[(0.051)(b)]}$) where "a" is the viscosity of the carrier polyol and "b" is the [(weight fraction of solids)(100)].

10 Claims, No Drawings

POLYMER POLYOLS AND A PROCESS FOR THE PRODUCTION THEREOF

The resent invention relates to polymer polyols and a process for the preparation thereof.

Polymer polyols suitable for the preparation of polyurethane foams and elastomers are well known and are widely used on a commercial scale. Polyurethane foams made from polymer polyols have a wide variety of uses. The two major types of polyurethane foams are slabstock and molded foam. Polyurethane slabstock foams are used in carpet, furniture and bedding applications. Molded polyurethane foams are used in the automotive industry for a variety of applications.

Polymer polyols are produced by polymerizing one or more ethylenically unsaturated monomers dissolved or dispersed in a polyol in the presence of a free radical catalyst to form; stable dispersion of polymer particles in the polyol. Initially, polymer polyols producing polyurethane foams having higher load-bearing properties than those produced from unmodified polyols were prepared using acrylonitrile monomer; however, many of these polymer polyols had undesirably high viscosity.

Presently, polyurethane foams having high load-bearing properties are predominantly produced using polymer polyols which are prepared using a high styrene content monomer mixture (for example, 65 to 75 percent styrene). However, polymer polyols produce from such high styrene monomer mixture often do not satisfy the ever-increasing industry needs, including acceptable viscosity, strict stability requirements and increased load-bearing properties.

Stability and low viscosity of polymer polyols are of increasing importance to polyurethane form manufacturers due to the development of sophisticated, high speed and large volume equipment and systems for handling, mixing and reacting polyurethane-forming ingredients. Polymer polyols must meet certain minimum polymer particle size requirements to avoid filters, pumps and other parts of such foam processing equipment becoming plugged or fouled in relatively short periods of time.

Numerous attempts have been made to produce polymer polyols which will meet foam processing and load-bearing properties required by the polyurethane foam industry.

International application PCT/EP95/04149 (Fogg) describes stable, relatively low viscosity polymer polyols prepared by free radical polymerization of a composition comprising a polyol; a preformed stabilizer which is the reaction production of a polyol, a precursor stabilizer obtainable by reacting a silicon compound with a polyether polyol, at least one ethylenically unsaturated monomer and a free radical polymerization initiator; at least one ethylenically unsaturated monomer; a free radical polymerization initiator; and, optionally, a chain transfer agent.

U.S. Pat. No. 5,196,476 (Simroth) describes: (a) a high potency preformed stabilizer; (b) the use of same in the manufacture of polymer polyols having high solids content, lower viscosity and excellent product stability; and (c) a polyurethane made using such polymer polyol. The preformed stabilizer is the free radical polymerization product of at least one free radically polymerizable ethylenically unsaturated monomer and at least one polyhydric alcohol adduct comprising a polyhydric alcohol residue and a residue of a compound having fumaric or maleic type unsaturation.

U.S. Pat. No. 5,364,906 (Critchfield et al.) describes a method for producing a stable, low viscosity polymer polyol via a modified seed method by the steps of (1) producing a first reaction product by polymerizing a first feed in a first continuous reactor in the presence of a initiator, the first feed comprising less than 50 weight percent of a total monomer proportion in at least 50 weight percent of a total base polyol proportion, optionally in the present of a precursor stabilizer which is prepared by reacting a polyol with maleic anhydride; and (2) producing a second reaction product by polymerizing a second feed in a continuous reactor in the presence of an initiator, the second feed comprising (a) the first reaction product, (b) at least 50 weight percent of the total monomer proportion, and (c) any balance of the base polyol proportion.

European Patent No. 0 162 589 B1 (Cloetens et al.) describes a nonaqueous dispersion stabilizer which is the reaction product of a polyether polyol having an average molecular weight greater than 400 and a hydroxyl number in the range of 20 to 280 with silicon atom containing compound having at least one olefinically unsaturated functional group and at least one functional group attached to the silicon atom which is reactable with the hydroxyl groups on the polyether polyol.

U.S. Pat. No. 4,661,531 (Davis et al.) describes a process for preparing a polymer polyol in a continuous process wherein the use of a chain transfer agent contributes to products having uniform viscosity.

Additional prior art of interest include U.S. Pat. No. Re. 32,733 (Simroth et al.); U.S. Pat. No. 3,931,092 (Ramlow et al.); U.S. Pat. No. 4,014,846 (Ramlow et al.); U.S. Pat. No. 4,093,573 (Ramlow et al.); U.S. Pat. No. 4,148,840 (Shah); U.S. Pat. No. 4,172,825 (Sho k et al.); U.S. Pat. No. 4,342,840 (Kozawa et al.); U.S. Pat. No. 4,390,645 (Hoffman et al.); U.S. Pat. No. 5,394,491 (Hoffman); U.S. Pat. No. 4,454,255 (Ramlow et al.); U.S. Pat. No. 4,458,038 (Ramlow et al); and U.S. Pat. No. 4,745,153 (Hoffman).

Although there has been progress in reduction of viscosity and increase in solids content of polymer polyols, there is still a need for polymer polyols having improved processing and load-bearing properties and for alternate methods for making such polymer polyols.

The present invention is directed to a low fouling process for the production of polymer polyol having a Brookfield Viscosity that is equal to or less than (a $e^{[(0.051)(b)]}$) where "a" is the viscosity of the carrier polyol and "b" is the [(weight fraction of solids)(100)]. Such a process comprises the use of a free radical initiator comprising at least a first active peroxide either alone or in conjunction with additional initiators which may be a different active peroxide or it may be an azo compound. When such additional initiators are also active peroxide, such additional initiators have a half life greater than that of the first active peroxide. By half life is meant the time necessary to reduce the initiator concentration by one half. The level of the first active peroxide is equal to or less than 0.6 weight percent (based on the total monomer content). When the first active peroxide is used in conjunction with additional initiators, the total weight percent (based on total monomer content) of the initiators is not greater than 1.0 weight percent with the proviso that, in any event, the level of the first active peroxide is equal to or less than 0.6 weight percent (based on the total monomer content). The invention is also directed to polymer polyols produced by such process and to their use in the production of foams and the foams produced thereby. The polymer polyols so produced have desirable properties including a high polymer content and product stability.

In one aspect, the present invention concerns a process for the preparation of a polymer polyol which comprises providing (a) a polyol; (b) a preformed stabilizer; (c) at least one ethylenically unsaturated monomer; (d) a free radical polymerization initiator comprising at least a first active peroxide at a level equal to or less than 0.6 weight percent based on total monomer content; and (e) a chain transfer agent to a reaction zone maintained at a temperature, preferably 120° C. to 140° C., sufficient to initiate a free radical polymerization, and under sufficient pressure to maintain only liquid phases in the reaction zone, for a period of time sufficient to react a major portion of the ethylenically unsaturated monomer to form a heterogenous mixture containing the polymer polyol and recovering same from this heterogenous mixture.

In another aspect, the present invention concerns a polymer polyol composition which has a polymer content of 30 to 60 weight percent, based on total weight, a Brookfield Viscosity that is equal to or less than (a $e^{[(0.051)(b)]}$) where "a" is the viscosity of the carrier polyol and "b" the [(weight fraction of solids)(100)] and product stability such that essentially 100% passes through a 150 mesh screen and, preferably, up to 100% passes through a 700 mesh screen. Such polymer polyols may be produced by a free radical polymerization of the composition comprising:

(a) a polyol;

(b) a preformed stabilizer;

(c) at least one ethylenically unsaturated monomer;

(d) a free radical polymerization initiator comprising at least a first active peroxide at a level of equal to or less than 0.6 weight percent based on total monomer content; and, (e) a chain transfer agent.

Yet in another aspect, the present invention concerns a polymer polyol composition which possesses a polymer content of 30 to 60 weight percent, based on total weight, a Brookfield Viscosity that is equal to or less than (a $e^{[(0.051)(b)]}$) where "a" is the viscosity of the carrier polyol and "b" is the [(weight fraction of solids)(100)], and product stability such that essentially 100% passes through a 150 mesh screen produced by a free radical polymerization of the above polymer polyol forming composition.

Yet in another aspect, the present invention concerns a polyurethane foam forming composition comprising the above polymer polyol composition, a polyurethane catalyst, an organic polyisocyanate, a silicone surfactant, and a blowing agent.

Yet in another aspect, the present invention concerns a polyurethane foam made from the above polyurethane foam forming composition.

The polymer polyol composition of the present invention possesses a polymer content of from 30, preferably 40, to 60 weight percent, the remainder being liquid polyol. The Brookfield Viscosity of the polymer polyol of the present invention is equal to or less than (a $e^{[(0.051)(b)]}$) where "a" is the viscosity of the carrier polyol and "b" is the [(weight fraction of solids)(100]. The polymer polyol compositions of the present invention also show exceptional stability such that essentially 100 percent passes through a 150 mesh screen and a significant amounts of high solids content polymer polyol, preferably essentially 100 percent, passe through 700 mesh screen.

The polymer polyol composition of the present invention is the reaction product of the composition comprising: (a) a polyol; (b) a preformed stabilizer composition; (c) at least one ethylenically unsaturated monomer; (d) a free radical polymerization initiator comprising at least a first active peroxide used at a level equal to or less than 0.6 weight percent based n the total monomer; and (e) a chain transfer agent.

The process for preparing the polymer polyols of the present invention comprises: providing a heterogenous mixture of a polyol, a preformed stabilizer composition, at least one free radically polymerizable monomer, a free radical polymerization initiator comprising at least a first active peroxide used at a level equal to or less than 0.6 weight percent based on the total monomer and a chain transfer agent, in a reaction zone maintained at temperature sufficient to initiate a free radical polymerization reaction, preferably from 120° C. to 140° C., inclusive, and under sufficient pressure to maintain only liquid phases the reaction zone, for a period of time sufficient to react a high proportion of the at least one ethylenically unsaturated monomer, and recovering the resulting polymer polyol.

Any known polyol having a functionality of at least two and a molecular weight in excess of 400, preferably from 1,000 and 15,000, more preferably from 2,000 to 8,000, and a hydroxyl number in the range 20 to 280 can be used for the preparation of polymer polyols of the present invention. These polyols are well known and are available commercially. Useful polyols may be, for example, polyether polyols, polyhydroxyl containing polyesters, polyhydroxyl terminated polyurethane polymers, polyhydric polythioethers, and polytetrahydrofurans. The preferred polyols are the polyether polyols. Most preferably, the polyether polyol should be a poly (oxyethylene) (oxypropylene) adduct of a hydroxy functional initiator or mixture of initiators having an average of at least two hydroxy groups per molecule, the initiator molecule or molecules being selected from water, glycerol, trimethylolpropane, diethylene glycol, propylene glycol, ethylene glycol, the isomers of butanetriol, pentanetriol and hexanetriol and penteerythritol, sucrose, sorbitol and the like. The polyol concentration in the polymer polyol forming composition is not critical and can be varied within wide limits. Typically, the concentration can vary from 40 to 80, preferably 45 to 70, more preferably from 50 to 60, weight percent, based on the total feed to the reactor. The particular polyol used will depend on the end use of the polyurethane foam to be produced. A mixture of various useful polyols can be used, if desired.

Any ethylenically unsaturated monomer which is free radically polymerizable can be used in the composition of this invention. It is preferred to use vinyl monomers. Preferred vinyl monomers are styrene, acrylonitrile, methacrylonitrile and methyl methacrylate. The most preferred vinyl monomers are styrene, acrylonitrile and mixtures thereof. When mixture of styrene and acrylonitrile is used, the weight proportion of styrene can vary from 80 to 20 weight percent and acrylonitrile can accordingly vary from 80 to 20 weight percent of the mixture. A styrene to acrylonitrile ratio in the monomer mixture of from 80:20 to 20:80 is preferred, with the ratio of from 70:30 to 50:50 being most preferred.

The preformed stabilizers useful in the present invention are known in the art and include without limitation those described in the references discussed herein. Preferred preformed stabilizers include those discussed in PCT/EP95/04149; U.S. Pat. No. 4,148,840 (Shah); and U.S. Pat. No. 5,364,906 (Critchfield).

Particularly preferred preformed stabilizers are prepared using as precursor stabilizers compounds obtained by reacting a silicon atom containing compound of formula

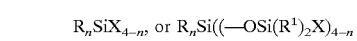

wherein the R groups are independently saturated or unsaturated hydrocarbyl groups, at least one R group being an olefinically unsaturated hydrocarbyl group; $R^1$ is a hydrocarbyl group, X is a $C_1$ to $C_{10}$ alkoxy group, n is an integer from 1 to 3 and p is an integer greater than zero, with polyether polyol having an average molecular weight in excess of 400 and a hydroxyl number in the range 20 to 280. The particularly preferred precursor stabilizers are the reaction products of vinyltrimethoxy silane, vinyltriethoxy silane or vinyltripropoxy silane with a polyetherpolyol having an average molecular weight in excess of 400 and a hydroxyl number in the range 20 to 280. These precursor stabilizers and their preparation are described in European Patent No. 0 162 589 B1 (Cloetens et al).

The preferred preformed stabilizer used in this invention may be prepared as described in PCT/EP95/04149 wherein a preformed stabilizer is prepared by providing a polyol, a precursor stabilizer; a monomer and a free radical polymerization initiator to a reaction zone maintained at a temperature sufficient to initiate a free radical polymerization, and under sufficient pressure to maintain only liquid phases in the reaction zone, for a period of time sufficient to react essentially all the precursor stabilizer and recovering a heterogenous mixture containing the preformed stabilizer composition.

The polyols used in the composition for preparing the preformed stabilizer composition of this invention may be for example polyether polyols, polyhydroxyl containing polyesters, polyhydroxyl terminated polyurethane polymers, polyhydric polythioethers, and polytetrahydrofurans. These polyols are well known and are commercially available. The preferred polyols are the polyether polyols. The polyether polyol used should have a number average molecular weight in excess of 400, preferably from 3,000, more preferably from 5,000 and a hydroxyl number in the range 20 to 280. Most preferably, the polyether polyol should be a poly (oxyethylene) (oxypropylene) adduct of an alcohol selected from glycerol, trimethylolpropane, diethylene glycol, the isomers of butanetriol, pentanetriol and hexanetriol and penteerythritol, sucrose and sorbitol. A mixture of polyols can be used, if desired. The polyol concentration in the preformed stabilizer forming composition is not critical and can be varied within wide limits. Typically, the concentration can vary from 50 to 90 weight percent or even more, preferably 60 to mixture of various useful polyols can be used, if desired.

Any ethylenically unsaturated monomer which is free radically polymerizable can be used as component (iii) in the preformed stabilizer forming composition of this invention. It is preferred to use vinyl monomers. Styrene, acrylonitrile, methacrylonitrile and methyl methacrylate are preferred vinyl monomers. Most preferred vinyl monomers are styrene, acrylonitrile and mixtures thereof. Typically, a minimum of 2 to 20 percent by weight of an ethylenically unsaturated monomer is used in the preformed stabilizer forming composition. When a mixture of styrene and acrylonitrile is used, the weight proportion of styrene can vary from 20 to 80 weight percent and acrylonitrile can accordingly vary from 80 to 20 weight percent of the mixture. A styrene to acrylonitrile ratio in the monomer mixture of from 80:20 to 20:80 is preferred, with the ratio of from 70:30 to 50:50 being most preferred.

The free radical polymerization initiator useful in the preparation of the preformed stabilizer of this invention can be any compounds which are routinely used to effect grafting of an ethylenically unsaturated polymer to a polyol including peroxides, perborates, persulphates percarbonates and azo compounds. Typical examples of such free radical initiators include, alkyl and aryl hydroperoxides, dialkyl and diaryl peroxides, dialkylperoxydicarbonates and azobis (nitriles). Preferred free radical initiators are tert-butylperoxy diethyl acetate and tert-butyl peroctoate. The free radical initiator concentration in the preformed stabilizer forming composition is not critical and can be varied within wide limits. Typically, the concentration can vary from 0.01 to 2.0 weight percent or even more, preferably 0.05 to 0.2 weight percent, based on the total feed to the reactor. The particular free radical initiator concentration selected will usually be an optimum value considering all factors, including costs.

Typically, the polyol is used in an amount of from 50 to less than 80 weight percent, the precursor stabilizer in an amount of from 10 to less than 50 weight percent, the monomer in an amount of from 5 to 15 weight percent and the free radical polymerization initiator in an amount of from 0.01 to 2 weight percent in the preformed stabilizer forming composition of this invention.

The process for preparing the preformed stabilizer is similar to the process for preparing the polymer polyol. The temperature range is not critical and may vary from 80° C. to 150° C. The preferred temperature range is from 110° C. to 130° C. The mixing conditions used are those obtained using a back mixed reactor. The reactors of this type keep the reaction mixture relatively homogenous and so prevent localized high monomer to precursor stabilizer ratios such as occur in tubular reactors, where all of the monomer is added at the beginning of the reactor.

The free radical polymerization initiator useful in the preparation of the polymer polyol comprise active peroxides. Such active peroxides include alkyl and aryl hydroperoxides. Such active peroxides may be used alone or may be used in conjunction with other initiators such as different active peroxides or azo compounds. When additional active peroxides are used, they are chosen so that they have a half life of less than the first active peroxide used in the process. Preferred free radical initiators include tert-butylperoxy diethyl acetate and tert-butyl peroctoate, tert-butyl peroxy isobutyrate, tert-butyl peroxy 3,5,5 trimethyl hexanoate, tert-butyl peroxy bezoate, tert-butyl peroxy pivalate, tert-amyl peroxy pivalate, tert-butyl peroxy 2 ethyl hexanoate. The free radical initiator concentration of the first active peroxide in the polymer polyol forming composition is critical and is less than 0.6 weight percent based on the total monomer. The concentration of the first active peroxide is greater than 0.1 weight % and is preferably less than 0.6 weight % based on monomer. When an additional initiator or initiators is used in addition to the first active peroxide initiator, the total concentration of the initiators is less than or equal to 1.0 weight percent based on the total monomer with the proviso that the concentration of the first active peroxide initiator is less than or equal to 0.6 weight percent based on the total monomer.

Any known chain transfer agent can be used in the polymer polyol forming composition of the present invention. Preferred chain transfer agents include isopropanol, diethylamine and n-dodecyl mercaptan. More preferred chain transfer agents are diethylamine and n-dodecyl mercaptan.

The polymer polyol forming composition is provided into the reactor, preferably a continuous, stirred, back-mixed reactor. The internal temperature of the reactor is controlled within a range of from 80° C. to 150° C., preferably 120° C. to 140° C. The contents of the reactor are well mixed with the residence time of at least 5 minutes, preferably from 15 to 45 minutes.

The process of this invention advantageously results in low levels of reactor fouling.

The polymer polyol composition of the present invention is useful in the preparation of polyurethane foams. Such polyurethane foams have excellent load-bearing and tensile strength properties without impairment of other physical properties of the foam.

The polyurethane foams are prepared by reacting the polymer polyol composition of the present invention with a polyfunctional organic isocyanate in the presence of a catalyst for the urethane forming reaction, a blowing agent and a foam stabilizer.

Polyfunctional organic isocyanates which can be used for the preparation of the polyurethane foam are well known and are available commercially. Illustrative examples of useful polyfunctional organic isocyanates include the toluene diisocyanates, especially 2,4- and 2,6-toluene diisocyanate (TDI) as well as any desired mixture of these isomers; 2,4'-and 4,4'-diphenylmethane diisocyanate (MDI) as well as any desired mixture of these isomers; oligomers of MDI (polymeric MDI), polymethylene polyphenyl polyisocyanates (commonly referred to as "crude MDI"); mixtures of TDI and polymeric MDI and mixtures of the these poly ocyanates. Prepolymers of the above isocyanate (e.g. with polyether polyols, glycols or mixtures of these) can also be used in the present invention. The preferred isocyanate is 80/20 TDI (a mixture of 80 percent 2,4-toluene diisocyanate and 20 percent 2,6-toluene diisocyanate). Polyfunctional isocyanates are used in amounts well known to persons skilled in the art.

Any of the known blowing agents conventionally used in the production of polyurethane foams can be used. Suitable blowing agents include water, halogenated hydrocarbons of low molecular weight, carbon dioxide and low boiling point hydrocarbons. The blowing agents are used in amounts well known to skilled persons.

Any of the polyurethane catalysts normally used in the preparation of polyurethane foams may be used in the process of the present invention including tertiary amines and organometallic compounds. The polyurethane catalyst is used in amounts well known to skilled persons. Mixtures of polyurethane catalysts may also be employed in the process of the present invention.

Any of the foam stabilizers or surfactants for cell stability or other cell size control agents normally used in the preparation of polyurethane foams can be used in the present invention. The foam stabilizers, surfactants for cell stability or other cell control agents are used in amount well known to skilled persons. Mixtures of one or more stabilizers and/or one or more surfactants may also be used. Suitable surfactants include the diverse silicone surfactants, preferably those which are block copolymers of a polysiloxane and a polyoxyalkylene as described in U.S. Pat. 3,629,308.

Known crosslinkers may also be used in the process of the invention to modify polyurethane foam properties. These crosslinkers are used in amounts well known to skilled persons.

In, addition to the above mentioned materials, any number of a variety of additives conventionally used in the production of polyurethane foams such as, for example, fire retardants defoamers, anti-oxidants, mold release agents, dyes, pigments and fillers can also be used the process of the present invention. These additives are used in amounts well known to killed persons.

The following designations, symbols, terms and abbreviations are used in the Examples below:

| | |
|---|---|
| CP-3040 | is a glycerine started polyol having hydroxyl number in the range of 54 to 59 and Average Molecular Weight of 3,000 and viscosity at 25° C. of 490 cps, available from The Dow Chemical Company under the trademark VORANOL CP-3040. |
| CP-4735 | is a glycerine started polyol having hydroxyl number in the range of 33 to 38 and Average Molecular Weight of 4,700 and viscosity at 25° C. of 820 cps, available from The Dow Chemical Company under the trademark VORANOL CP-4735. |
| DNC-635.04 | is a sorbitol started polyol having hydroxyl number of 30 and Average Molecular Weight of 7000. |
| VTMSP | vinyltrimethoxy silane modified precursor stabilizer prepared according to Example 3 of EP-0 162 589 B1. |
| Trigonox 42S | is a free radical polymerization initiator containing tert butyl peroxy 3,5,5 trimethyl hexanoate sold by Akzo Chemie under the trademark TRIGONOX 42S |
| Trigonox 121 | is a free radical polymerization initiator containing tert amyl peroxy 2 ethyl hexanoate sold by Akzo Chemie under the trademark TRIGONOX 121 |
| Trigonox 27 | is a free radical polymerization initiator containing tert butyl peroxy diethylacetate sold by Akzo Chemie under the trademark TRIGONOX 27. |
| Vazo 67 | is a 2,2'-Azobis(2-methylbutanenitrile) polymerization catalyst made by E. I. DuPont de Nemours and Co. |

-continued

| | |
|---|---|
| Dabco 33LV | a 33 percent solution of triethylene diamine in dipropylene glycol, sold by Air Products and Chemicals Inc. Under the trademark DABCO 33LV. |
| Niax A-107 | is a formic-acid-blocked version of 70% bis(2-dimethylaminoethyl)ether/30% dipropylene glycol amine catalyst available from Union Carbide Corp. Under the trademark NIAX A-107. |
| DEOA | is Diethanolamine. |
| DC-5164 | is a silicone surfactant sold by Dow Corning Corporation. |
| NDM | is n-dodecyl mercaptan |
| IPA | is isopropanol. |
| TDI-80 | is a 80:20 mixture of the 2,4- and 2,6-toluene diisocyanate isomers sold by the Dow Chemical Company under the trademark Voranate T80. |
| Index | is the ratio of the amount of reactive isocyanate groups in the reaction mixture divided by the amount of active hydrogen groups in the reaction mixture multiplied by 100. |
| STN | is Styrene. |
| CAN | is Acrylonitrile |
| Preformed Stabilizer | is a preformed stabilizer prepared according to Example 1 if PCT/EP95/04149 (Fogg) |

Properties of the polymer polyol composition and polyurethane foams given in the Examples below are determined according to the following test methods:

| | |
|---|---|
| Air Flow (cfm) | is measured according to the ISO 7231 test method (on AMSCOR foam porosity instrument). |
| Density | is measured according to the DIN 53420 test method. |
| CFD 40% (kPa) | is Compression Force Deflection determined according to DIN 53577. |
| IFD 25% (N) | is Indentation Force Deflection 25% determined according to ASTM D-3574, Test B1 and B2. |
| IFD 40% (N) | is indentation Force Deflection 40% determined according to ASTM D-3574, Test B1 and B2. |
| IFD 65% (N) | is Indentation Force Deflection 65% determined according to ASTM D-35741 Test B1 and B2. |
| SAG factor | is Indentation Force Deflection 65% divided by Indentation Force Deflection 25%. |
| Tensile Strength (kPa) | is determined in accordance with ASTM D-3574. |
| Elongation (%) | is determined in accordance with ASTM D-35741 Test E. |
| Tear Strength (N/m) | is determined in accordance with ASTM D-3574. |
| Filterability | is Filtration Hindrance determined by diluting one part by weight sample (e.g.470 g) of polymer polyol with two parts by weight anhydrous isopropanol (e.g. 960 g) to remove any viscosity-imposed limitations and using a fixed quantity of material in relation to fixed cross-sectional area of screen, such that all of the polymer polyol and isopropanol solution passes by gravity through a 150-mesh or 700-mesh screen. The 150-mesh screen has a square mesh with average mesh opening of 105 microns and is a "Standard Typer" 150 square-mesh screen. The 700-mesh screen is made with a Dutch twill weave. The actual screen used had a nominal opening of 30 microns. The amount of sample which passes through the screen within 3000 seconds is reported as percent, a value of 100 percent indicates that over 99 weight percent passed through the screen |
| Viscosity | is measured using a Brookfield viscometer, spindle # LVVT3, speed 12, in accordance with ASTM D-4874. |

The following examples are given to illustrate the invention and should not be interpreted as limiting it in any way. Unless stated otherwise, all parts and percentages are given by weight.

EXAMPLES 1 TO 11
PREPARATION OF POLYMER POLYOL COMPOSITION

The polymer polyol of the present invention was prepared using a continuous polymerization system, using a tank reactor fitted with baffles and impeller. In the Examples, the polymer polyol composition feed components were pumped into the reactor continuously after going through an in line mixer to assure complete mixing of the feed components before entering the reactor. The contents of the reactor were well mixed. The internal temperature of the reactor was controlled to within 1° C. The product flowed out the top of the reactor and into a second unagitated reactor also controlled within 1° C. The product then flowed out the top of the second reactor continuously through a back pressure regulator that had been adjusted to give about 45 psig pressure on both reactors. The crude polymer polyol product then flowed through a cooler into a collection vessel. Percent by weight polymer in the polymer polyol was determined from analysis of the amount of unreacted monomers present in the crude product. The crude product was vacuum stripped to remove volatiles before testing.

All the polymer polyols produced were stable compositions. The polymer polyol feed compositions, preparation conditions and polymer polyol properties are shown in Table 1 below.

produced in Examples 9 and 10 herein. Foam formulations and foam properties are shown in Table 2 below. As can be seen from Table 2 below, polyurethane foams prepared in Example 13 using the polymer polyol of the present invention exhibit high load-bearing characteristics than those from Example 12 without any significant loss in other physical characteristics.

TABLE 3

|  | Example 12 | Example 13 |
|---|---|---|
| Formulation (pphp) | | |
| Copolymer polyol from Example 9 | 100 | — |
| Copolymer Polyol from Example 10 | — | 100 |
| T80/20 | 41.9 | 41.9 |
| Isocyanate index | 110 | 110 |
| Water (total) | 3.4 | 3.4 |

TABLE 1

| Example | | 1 | 2 | 3 | 4 | 5 | 6 | 7 | 8 | 9 | 10 | 11 |
|---|---|---|---|---|---|---|---|---|---|---|---|---|
| Formulation: | | | | | | | | | | | | |
| CP-4735 | parts | 50.5 | 53.2 | 53.2 | 52.6 | 52.6 | 53.2 | 52.6 | 52.5 | 0 | 0 | 0 |
| CP-3040 | parts | 0 | 0 | 0 | 0 | 0 | 0 | 0 | 0 | 47.6 | 53.1 | 41.7 |
| Preformed Stabilizer | parts | 3.8 | 3.5 | 3.5 | 4.0 | 4.0 | 3.5 | 4.0 | 4.0 | 2.1 | 2.0 | 2.0 |
| Trigonox 121 | parts | | | | | | | | 0.15 | 0 | 0 | 0 |
| Trigonox 27 | parts | 0 | 0.08 | 0.1 | 0.12 | 0.08 | 0.08 | 0 | 0 | 0.0 | 0.20 | 0.18 |
| AMBN | parts | | | | | | | | 0 | 0.50 | 0 | 0 |
| Trigonox 42S | | 0 | 0 | 0 | 0 | 0 | 0 | 0.15 | 0 | 0 | 0 | 0 |
| Vazo 67 | parts | 0.4 | 0 | 0 | 0 | 0.08 | 0 | 0 | 0 | 0 | 0 | 0 |
| STY | parts | 24.6 | 25.7 | 25.7 | 25.7 | 25.7 | 25.7 | 25.7 | 25.6 | 29.3 | 30.3 | 36.3 |
| CAN | parts | 16.4 | 17.1 | 17.1 | 17.1 | 17.1 | 17.1 | 17.1 | | | | |
| ACN | parts | | | | | | | | 17.1 | 12.6 | 12.9 | 17.5 |
| IPA | parts | 4.3 | 0 | 0 | 2 | 0 | 0 | 0 | 0 | 2.07 | 0 | 0 |
| NDM | | 0 | 0.45 | 0.40 | 0.45 | 0.45 | 0.45 | 0.50 | 0.70 | 0 | 0.35 | 0.35 |
| Prep. Conditions: | | | | | | | | | | | | |
| React. Temp. | ° C. | 125 | 130 | 130 | 130 | 130 | 130 | 130 | 130 | 125 | 130 | 130 |
| Monomer in total feed | wt % | 41.0 | 42.8 | 42.8 | 42.8 | 40.5 | 42.8 | 42.7 | 42.70 | 41.9 | 42.8 | 53.8 |
| Ratio ACN/STY | | 40/60 | 40/60 | 40/60 | 40/60 | 40/60 | 40/60 | 40/60 | 40/60 | 30/70 | 30/70 | 30/70 |
| Residual STY | parts | 0.98 | 2.63 | 2.73 | 2.73 | 1.84 | 2.25 | 3 | 2.59 | 2.47 | 2.74 | 4.91 |
| Residual ACN | parts | 1.35 | 3.08 | 2.7 | 2.52 | 2.02 | 1.9 | 2.76 | 2.72 | 1.04 | 1.38 | 2.25 |
| Total polymer | wt % | 41.50 | 39.34 | 39.55 | 39.64 | 40.48 | 40.33 | 39.29 | 39.49 | 38.8 | 40.39 | 50.25 |
| Product Properties: | | | | | | | | | | | | |
| Viscosity | cps | 5830 | 4060 | 4250 | 4800 | 4800 | 4300 | 4460 | 4700 | 4300 | 2830 | 5450 |
| Filterability: | | | | | | | | | | | | |
| 150-mesh | % | 100 | 100 | 100 | 100 | 100 | 100 | 100 | 100 | 100 | 100 | 100 |
| 700-mesh | % | 100 | 100 | 100 | 100 | 100 | 100 | 100 | 100 | 100 | 100 | 100 |

EXAMPLES 12 TO 13

PREPARATION OF POLYURETHANE FOAMS

Polyurethane foams were produced by pouring foam formulations shown in Table 3 below into an aluminum, 16 liter (40×40×10 em), 4 vent holes mold heated to a temperature of about 60° C. using Admiral high pressure pouring machine DHF-I and Krauss Maffei MK12-12/16-UL-2K Duplex mixing head and allowing the foam to rise and curing. The foam demould time was 5 minutes. Klüber 918/9K mold release agent (sold by Klüber AG) was used as the mold release agent. The polyol component/isocyanate component tanks pressure was 3 bars. Both the polyol component and isocyanate components were dispensed at about 150 bars pressure. Polymer Polyol used in the foam formulation shown in Table 2 below is the polymer polyol TABLE 3-continued

|  | Example 12 | Example 13 |
|---|---|---|
| Tegostab BF 2370 | 1.0 | 1.0 |
| Niax A-1/Dabco 33LV ½ | 0.15 | 0.15 |
| Stannous octoate | 0.20 | 0.20 |
| Physical properties | | |
| Density (kg/m$^3$) | 26.5 | 25.9 |
| CFD 40% (kPa) | 9.3 | 10.3 |
| IFD 25% (N) | 264 | 289 |
| IFD 40% (N) | 332 | 365 |
| IFD 65% (N) | 728 | 813 |
| SAG (–) | 2.8 | 2.8 |

TABLE 3-continued

|  | Example 12 | Example 13 |
| --- | --- | --- |
| Tensile strength (kPa) | 217 | 226 |
| Elongation (%) | 92 | 104 |
| Tear strength (N/m) | 472 | 460 |

What is claimed is:

1. A polymer polyol composition which has a polymer content of 20 to 60 weight percent, based on total weight, a Brookfield Viscosity that is equal to or less than (a $e^{[(0.051)(b)]}$) where "a" is the viscosity of the carrier polyol and "b" is the [(weight fraction of solids)(100)] an product stability such that essentially 100% passes through a 150 mesh screen and up to 100% passes through a 700 mesh screen produced by a free radical polymerization of the composition comprising:

(a) polyol;

(b) a preformed stabilizer;

(c) at least one ethylenically unsaturated monomer;

(d) a free radical polymerization initiator comprising at least a first active peroxide, said fir t active peroxide being present in an amount of equal to or less than 0.6 weight percent, based on the total monomer; and, (e) a chain transfer agent.

2. A polymer polyol composition as claimed in claim 1, wherein the free radical polymerization initiator further comprises an additional active peroxide initiator different from the first active peroxide initiator and having a half life greater than that of the first active peroxide.

3. A polymer polyol composition as claimed in claim 1, wherein the free radical polymerization initiator further comprises an azo compound.

4. A polymer polyol composition as claimed in claim 1, claim 2 or claim 3, wherein the first active peroxide free radical polymerization initiator is selected from the group consisting of tert-butylperoxy diethyl acetate; tert-butyl peroctoate; tert-butyl peroxy isobutyrate; tert-butyl peroxy 3,5, 5trimethyl hexanoate; tert-butyl peroxy bezoate; tert-butyl peroxy pivalate; tert-amyl peroxy pivalate; and tert-butyl peroxy 2 ethyl hexanoate.

5. A polymer polyol composition as claimed in claim 4, wherein the chain transfer agent n-dodecyl mercaptan.

6. A process for the preparation of polymer polyol composition which has a polymer content of 20 to 60 weight percent, based on total weight, a Brookfield Viscosity that is equal to or less than (a $e^{[(0.051)(b)]}$) where "a" is the viscosity of the carrier polyol and "b" is the [(weight fraction of solids)(100)] and product stability such that essentially 100% passes through a 150 mesh screen and up to 100% passes through a 700 mesh screen produced by a free radical polymerization of the composition:

(a) a polyol;

(b) a preformed stabilizer;

(c) at least one ethylenically unsaturated monomer;

(d) a free radical polymerization initiator comprising at least a first active peroxide, said first active peroxide being present in an amount of equal to or less than 0.5 weight percent, based on the total monomer content; and, (e) a chain transfer agent;

In a reaction zone maintained at a temperature sufficient to initiate a free radical polymerization, under sufficient pressure to maintain only liquid phases in the reaction zone, for period of time sufficient to react essentially at least major portion of the at least one ethylenically unsaturated monomer and recovering the polymer polyol.

7. A process according to claim 6, wherein the reaction zone is maintained at the temperature of from 120° C. to 140° C.

8. A composition for the preparation of a polyurethane foam wherein there is used polymer polyol, a polyurethane catalyst, an organic polyisocyanate, a surfactant, and a blowing agent, characterized in that the polymer polyol comprises polymer polyol as claimed in any one of claims 1 to 5.

9. A polyurethane foam prepared from a composition as claimed in claim 8.

10. A polyurethane foam prepared from a polymer polyol composition as claimed in any one of claims 1 to 5.

* * * * *

UNITED STATES PATENT AND TRADEMARK OFFICE
CERTIFICATE OF CORRECTION

PATENT NO.   : 6,455,603 B1
DATED        : September 24, 2002
INVENTOR(S)  : Graeme D. Fogg It is certified that error appears in the above-identified patent and that said Letters Patent is hereby corrected as shown below:

<u>Column 8,</u>
Line 58, the reference "ASTM-D-4874" be corrected to -- ASTM-D-4878 --

Signed and Sealed this

Twenty-fifth Day of February, 2003

JAMES E. ROGAN
*Director of the United States Patent and Trademark Office*